March 17, 1970 R. L. GRAY 3,501,193
SYSTEM FOR ENGAGING CARGO CONTAINERS
Filed Feb. 7, 1968 3 Sheets-Sheet 1
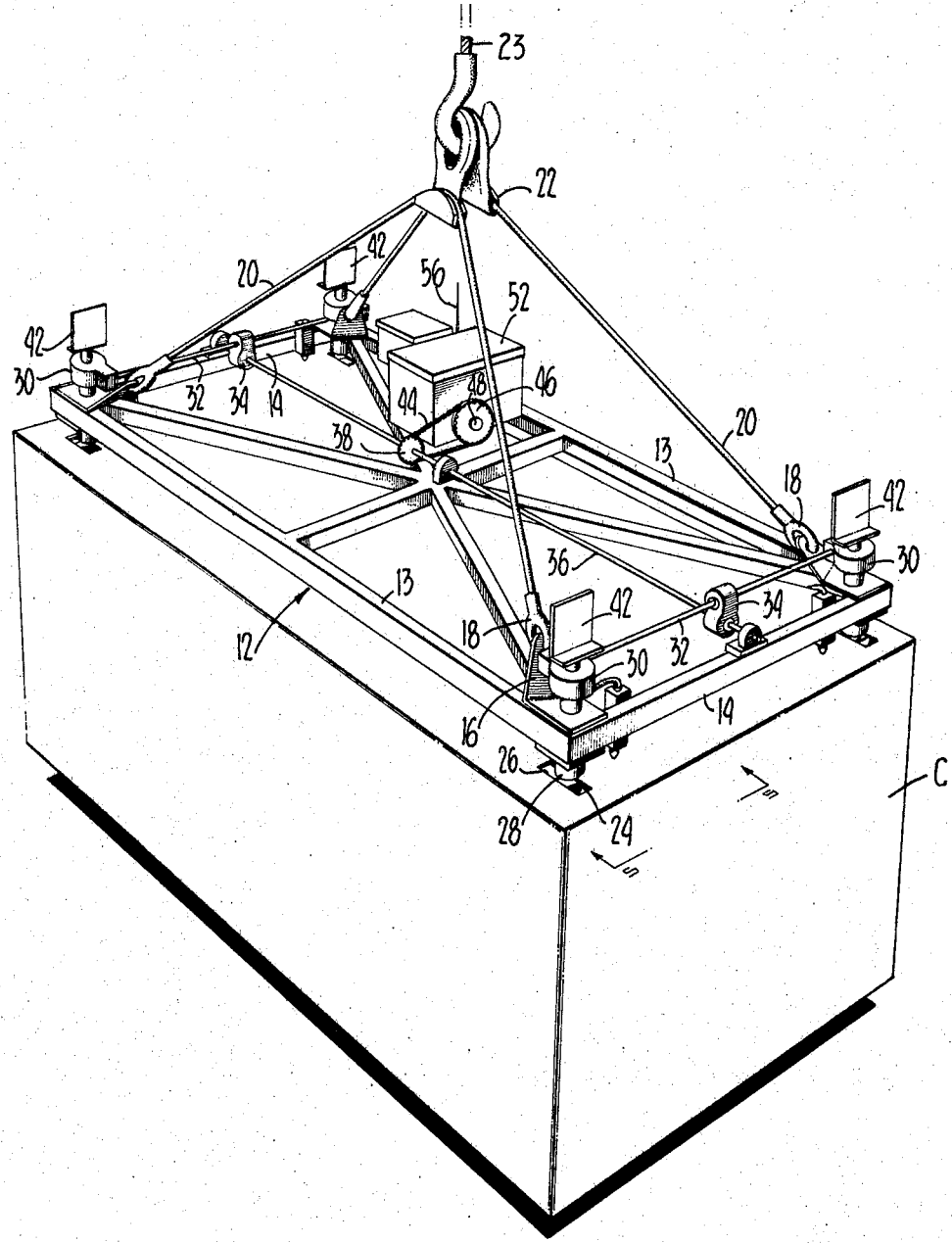
FIG_1
INVENTOR.
ROBERT L. GRAY
BY
Townsend and Townsend
ATTORNEYS March 17, 1970     R. L. GRAY     3,501,193
SYSTEM FOR ENGAGING CARGO CONTAINERS
Filed Feb. 7, 1968     3 Sheets-Sheet 2
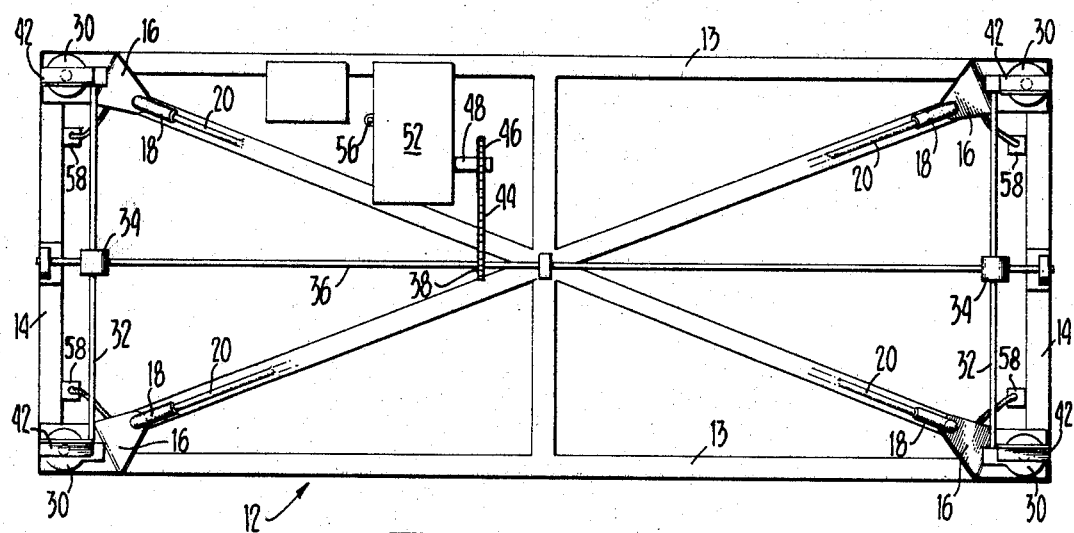
FIG_2
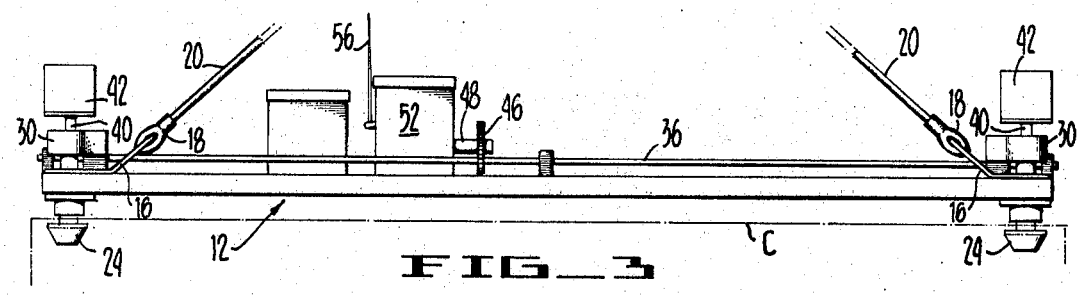
FIG_3
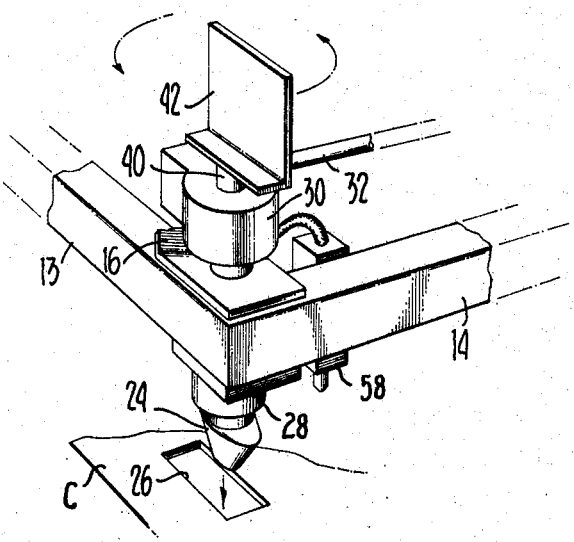
FIG_4
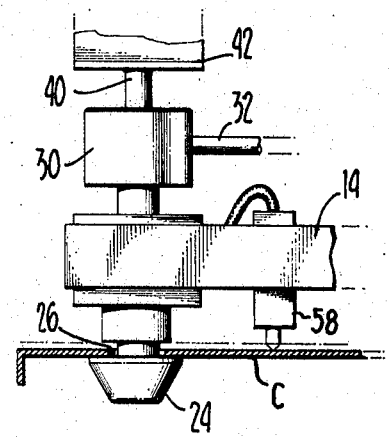
FIG_5

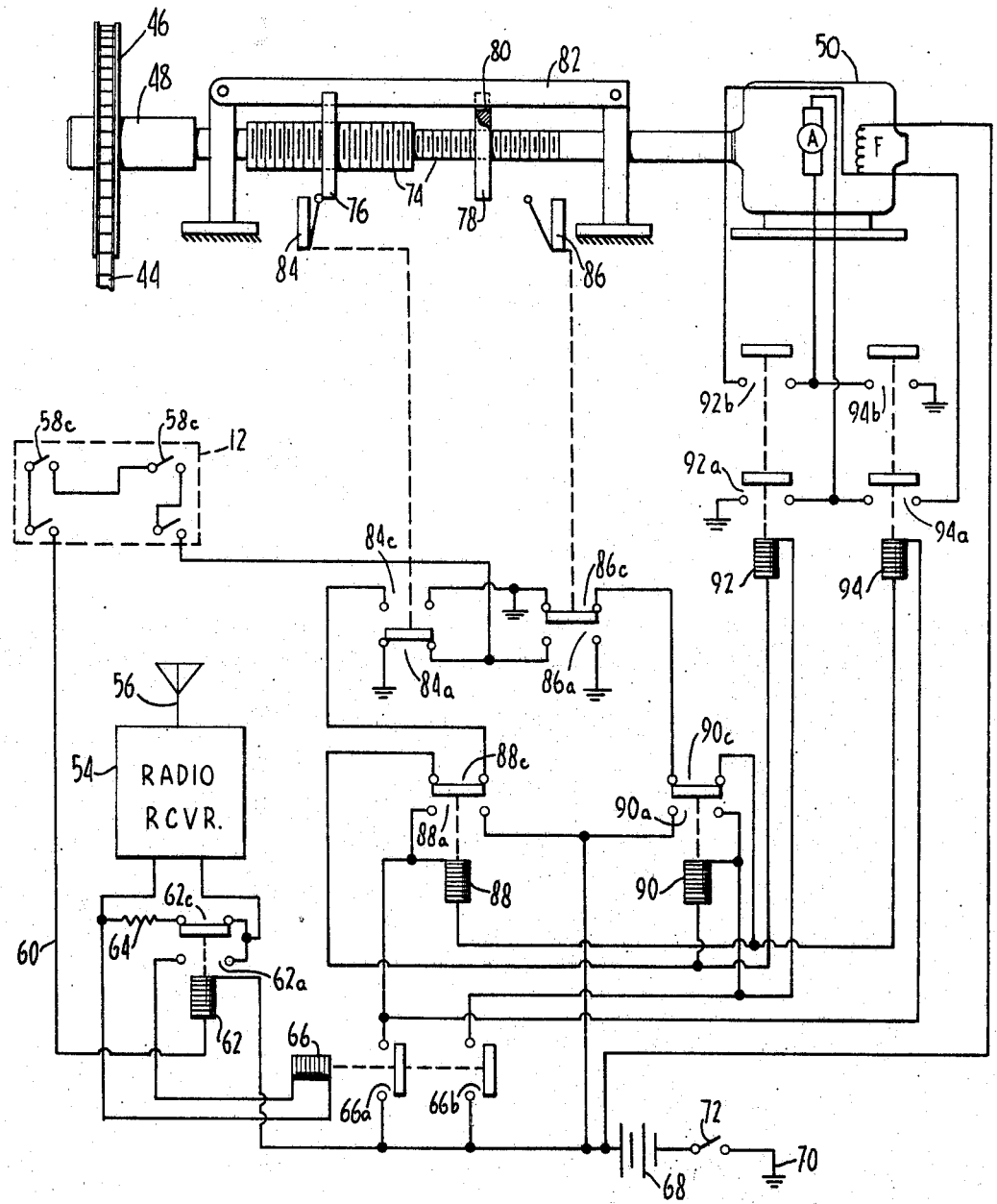
FIG_6

United States Patent Office 3,501,193
Patented Mar. 17, 1970

3,501,193
SYSTEM FOR ENGAGING CARGO CONTAINERS
Robert L. Gray, Metairie, La., assignor to States Steamship Company, San Francisco, Calif., a corporation
Filed Feb. 7, 1968, Ser. No. 703,633
Int. Cl. B66c 1/24
U.S. Cl. 294—67                        5 Claims

ABSTRACT OF THE DISCLOSURE

In combination with a spreader frame of the type employed for engaging cargo containers during loading and unloading of such containers, a radio control system for effecting automatic engagement and disengagement with the container. A control system having interlocks that prevent the inadvertent disengagement of a container and also prevent engagement with a container except when perfect alignment between the spreader frame and the container is achieved. Indicator flags for mounting on rotatable shafts of container locking pins which indicator flags indicate to bystanders the condition, i.e., locked or unlocked, of the locking pins with respect to the container.

---

This invention relates to a system for controllably engaging cargo containers preparatory to lifting the same from a dock or like storage area to a ship or like transport vehicle. More specifically, the invention relates to a control system for controlling rotatable locking pins between a locked and unlocked position which control system operates with facility and safety.

The art of containerizing cargo before transporting the cargo, although relatively new, has experienced rapid development. The economies achieved in loading and unloading cargo containers, as contrasted with loose cargo articles, have been remarkable. The system of the present invention further enhances the efficiency in handling containers.

Typical cargo containers have in the tops thereof elongate lock openings; motor driven locking pins for effecting engagement with such openings are well known. Control of such motor driven locking pins is accomplished through cables that extend from a cargo engaging spreader frame on which the locking pins are mounted up to a control station. Because the control station is fixed, typically at the control site of the winch or like hoisting machinery used to lift the containers, several longshoremen must be stationed at strategic places in order to signal the winch operator to engage and/or disengage a cargo container. The present invention provides a completely radio-controlled system so that the individual having control over the engagement and/or disengagement of cargo containers can move about as circumstances dictate. Typically, the hatch boss controls the cargo engagement because he is normally stationed on deck and can move from a position adjacent the hatch to a position looking down at the dock.

For successful employment aof a radio-controlled system, certain safety precautions are essential so as to avoid any possibility of inadvertent release of a container at an inauspicious moment. One form of innerlock provided by the present invention is a plurality of series connected limit switches that are arranged to close a circuit to the container disengaging apparatus if, and only if, all tension on the lifting device is removed, a condition existing when the weight of the container is supported on a suitable load bearing surface such as a dock or ship's hold.

A feature and advantage of the present invention is that a visual indication of the rotated position of the locking pins is at all times provided so that the hoist operator and the longshoremen are apprised of the operative condition of the system. Such continuous visual indication of system condition has safety advantages in that the hoist operator can defer lifting the container until the locking pins appear to be fully engaged to the container.

The objects, features and advantages of the present invention will be more apparent after referring to the following specification and accompanying drawings in which:

FIGURE 1 is a perspective view of a spreader frame having the system of the present invention and overlying a container;

FIGURE 2 is a plan view of the spreader frame of FIGURE 1; and

FIGURE 3 is an elevation view of the spreader frame of FIGURE 1;

FIGURE 4 is a fragmentary perspective view at enlarged scale of one corner of the spreader frame and the locking pin mechanism;

FIGURE 5 is an elevation view similar to FIGURE 4 showing the locking pin in engagement with a container; and FIGURE 6 is a schematic diagram of the control circuit of the present invention.

Referring more particularly to the drawings, reference numeral 12 indicates a rectangular spreader frame formed of structural side member 13 to the ends of which are joined structural end members 14. The specific dimensions of the rectangular spreader frame are selected in accordance with the size of the container to be engaged by the spreader. For securing the spreader frame to a hoisting line each corner of the spreader frame is provided with an apertured corner plate 16 that mounts a shackle 18 to which is secured a cable 20 that forms part of a conventional sling. Cables 20 terminate centrally in a fitting 22 that affords connection of a hoisting line shown fragmentarily at 23.

For engaging the container, frame 12 includes at each corner thereof a rotatable locking pin 24, a conventional element. Locking pin 24 is mounted for rotation in frame 12 between a first position shown in FIGURE 4, at which position the pin can be inserted in a complementary slot 26 on a container C. The pin is also movable to a second position (see FIG. 5) that is 90° from that shown in FIGURE 4. In such second position the pin is locked within the corner casting, and therefore, the spreader is in lifting engagement with the container. The locking pin is carried on an integral shaft 28 that terminates above frame 12 at a gear box 30. Gear box 30, a conventional device, has a shaft 32 extending in a horizontal plane; a pair of shafts 32 from opposite gear boxes extends to a second gear box 34, mounted generally centrally of end frame members 14. As can be seen in FIGURE 1, a common shaft 36 extends between gear boxes 34; common shaft 36 has a drive sprocket 38 thereon. It will thus be seen that rotation of sprocket 38 will rotate locking pins 24 between a first free position and a second container engaging position.

Each gear box 30 has a shaft 40 extending upwardly therefrom, which shaft is joined to shaft 28 for rotation therewith. Mounted atop shaft 40 is a rigid plate 42 that is preferably brightly colored so as to be readily visible for functioning as a flag or indicator of the rotative position of locking pin 24. As viewed in FIGURES 2 and 4, plates 42 extend longitudinally of the frame, a position indicating that locking pins 24 are in the first or free position and are ready for entry into a complementary aperture 26 on container C.

Engaged with sprocket 38 is a chain 44 which is trained around a driving sprocket 46 that is mounted on a shaft 48. Shaft 48 is connected to be driven by a motor 50 which is located in a cabinet 52 attached to frame 12. Among other things, cabinet 52 contains a radio wave receiver 54 and an external antenna 56 that is connected to the front end of receiver 54.

As can be seen in FIGURE 6, motor 50 has an armature A and a field winding F.

The circuit of FIGURE 6 is adapted to receive a signal in antenna 56 and to utilize that signal to controllably drive motor 50 to lock or unlock locking pins 24. In order to assure that locking pins 24 can be moved only when the locking pins are not supporting the load of container C, the apparatus of the present invention includes at each corner thereof a limit switch 58 that has a normally open contact 58c (see FIGURE 6). Contacts 58c are closed only when spreader frame 12 is resting on a container with cable 23 slack. As can be seen in FIGURE 5, the actuator of limit switch 58 rests on the top surface of container C, and when cable 23 is slackened, contacts 58c are closed.

As can be seen in FIGURE 6, the four contacts 58c are connected in series so that a circuit therethrough is established only when all four switches are closed, a condition obtaining only when all four locking pins 24 are received into openings 26 on container C. The series combination of limit switch contacts 58c is connected by a conductor 60 in series with a relay coil 62 so that relay coil 62 cannot be energized unless all four limit switch contacts 58c are completed. Associated with relay coil 62 is a normally closed contact 62c which shunts the output of radio receiver through a dummy load 64. Also associated with relay coil 62 is a normally open contact 62a which connects the output of radio receiver 54 across a relay coil 66 so as to energize the relay. Relay coil 66 activates a circuit for driving motor 50 to lock or unlock locking pins 24. Associated with relay coil 66 are normally open contacts 66a and 66b. The contacts are adapted to connect a battery 68 to the circuit; one terminal of the battery is grounded at 70 through an on-off switch 72.

Mounted in driven relation with respect to shaft 48 are threaded segments 74. Engaged with the threaded portions are a first actuating disc 76 and a second actuating disc 78. Each of the discs has an internal threaded opening for threaded engagement with the threaded segments on the shaft; in the periphery of each disc is formed a notch 80 that slidably embraces a longitudinally extending frame member 82 so as to prevent rotation of disc 76 and disc 78 when shaft 48 rotates. Thus, when the shaft rotates, disc members 76 and 78 are moved longitudinally along the shaft. At one end of travel, for engagement with disc 76, is a limit switch 84; at the opposite end is a limit switch 86 that is adapted for engagement by disc 78. By disengaging disc 76 and disc 78 from frame member 82 and rotating the discs with respect to the threaded portion 74 of the shaft, the position of the disc can be established so that limit switch 84 is closed when locking pins 24 rotate to one extremity, for example, to an unlocked position, and disc 78 can be adjusted to close limit switch 86 when the locking pins are rotated to the other extremity, for example, a locked position. Associated with limit switch 84 is a normally closed contact 84c and a normally open contact 84a. In FIGURE 6, contacts 84c and 84a are shown in their off-normal condition, a condition that exists because limit switch 84 is actuated by disc 76. Limit switch 86 includes a normally closed contact 86c and a normally open contact 86a. Thus, actuation of either of limit switch 84 or limit switch 86 indicates that locking pins 24 have arrived at one or the other extremes of movement.

A pair of lock-out relay coils 88 and 90 is provided in the control circuit for motor 50. Relay 88 has a normally open contact 88a connected in shunt with contact 66a of relay 66, and relay 90 has a normally open contact 90a in shunt with contact 66b. It will thus be seen that when either relay 88 or 90 is energized so that the normally opened contact is moved to a closed position, the respective coil of the relay is supplied with power from battery 68 through the contact of the relay actuated. The ground return for each of coils 88 and 90 is supplied through the opposite relay. For the latter purpose normally closed contact 88c connects one terminal of the coil of relay 90 to ground through contact 84c. Normally closed contact 90c connects the coil of relay 88 to ground through contact 86c. In shunt with relay coils 88 and 90 are power solenoids 92 and 94, respectively. Actuation of solenoid 92 drives motor 50 in one rotative direction; actuation of solenoid 94 drives motor 50 in the opposite rotative direction.

Solenoid 92 includes normally open contacts 92a and 92b; when the contacts are closed in response to energization of solenoid coil 92, the armature and field of motor 50 are connected in series with the relative polarity of the armature and field opposite. Solenoid 94 has two normally open contacts 94a and 94b; when the contacts are closed in response to energization of solenoid coil 94, the armature and field of motor 50 are connected in series with the relative polarity of the armature and field the same.

Operation of the circuit of FIGURE 6 is as follows. When spreader frame 12 is lowered onto container C so as to effect closure of all four limit switch contacts 58c, a path is established from battery 68 through relay coil 62 and through contacts 84a of limit switch 84 to ground. Assuming that on-off switch 72 is on, current flows through relay coil 62 so as to close contact 62a and open contact 62c. When a signal is received in antenna 56, such as through a hand-held transmitter operated by a person on the deck of a ship being loaded, the radio receiver 54 generates an output signal which energizes coil 66. Contacts 66a and 66b are therefore closed. Only the closure of contacts 66a has effect on the system in the condition shown in FIGURE 6 because the current path through contact 66b and relay coil 90 is broken by the open condition of contact 84c. Closure of contact 66a causes energization of relay coil 88 because a current path from battery 68 is established through contacts 66a, coil 88, contact 90c and contact 86c to ground. Because solenoid coil 94 is in shunt with relay coil 88, solenoid 94 is energized concurrently with coil 88 so as to close contacts 94a and 94b and start motor 50 rotating. Relay 88 is held in an energized position by current flow along a path from battery 68 through contact 88a and coil 88 and thence through contacts 90c and 86c to ground. Accordingly, relay 88 and solenoid 94 are held in an energized position so that motor 50 continues to rotate and, therefore, moves locking pins 24 to a locked position. Simultaneous with arrival of the locking pins at a locked position, disc 78 operates limit switch 86, the effect of which is to open contacts 86c and interrupt the current path through relay coil 88 and solenoid 94. Such interruption de-energizes coil 94, as a consequence of which motor 50 stops rotating. The termination of movement of locking pins 24 is most conveniently discerned by observing rigid plates 42. When the engagement of the locking pins is so discerned, the hoist operator is then free to lift the container and deposit it where desired. When the container is lifted, limit switches 58 are de-actuated because a certain amount of play exists between locking pins 24 and container socket openings 26. Accordingly, when the container is suspended, any spurious or inadvertent signals received by antenna 56 are harmlessly dissipated through dummy load resistor 64 because relay 62 cannot be operated when limit switch contacts 58c are opened.

The presence of four limit switches, one at each corner of spreader frame, also assures that the spreader is fully seated in place before a container can be engaged. Thus, the system assures that all four locking pins 24 will be engaged in all four corresponding socket openings 26.

When the container is again rested on a surface so that limit switches 58c are closed, relay 62 is operated so that a subsequent pulse received at antenna 56 will cause radio receiver 64 to energize coil 66. The consequent closure of contact 66b establishes a current path from battery 68 through contact 66b, relay coil 90, contact 88c and contact 84c to ground. Thus, solenoid coil 92 is energized and motor 50 is driven in the opposite direction, which movement continues until disc 76 operates limit switch 84. Relay coil 90 and solenoid 92 are maintained in a closed position because relay coil 90 is energized through its own contacts 90a until limit switch contact 84c is opened.

Thus, it will be seen that the present invention provides a radio-controlled locking system for a container engaging spreader frame, which system is relatively straightforward and has sufficient interlocks as to be safe and substantially fully automatic. Because indicator plates 42 are provided with each locking pin, the operator of the device and nearby workmen can discern at all times of the condition of the locking pins.

Although one embodiment of the invention has been shown and described, it will be apparent that other adaptations and modifications can be made without departing from the true spirit and scope of the invention.

What is claimed is:

1. In connection with a lifting frame that has a plurality of locking pins in predetermined spatial relation registrable with sockets affixed to a container in complementary spatial relation and moveable between a first position at which said pins are penetrable of said sockets and a second position at which said pins can engage said sockets to fasten said frame to the container, apparatus for controllably moving said locking pins between said first position and said second position comprising means for selectively driving said locking pins between said first and second positions, a wave receiver mounted on said frame and having an output for actuating said driving means in response to reception of a wave and means for connecting said receiver to said driving means only when all pins have fully penetrated said sockets.

2. Apparatus according to claim 1 wherein said locking pins are mounted for rotation about a vertical axis and wherein said first position is rotatively spaced from said second position by approximately 90°, said apparatus including a rigid plate mounted for rotation with each said pin, said plate having a brightly colored surface to afford a visual indication of the rotative position of said locking pins.

3. Apparatus according to claim 1 wherein said locking pins are mounted for rotation about a vertical axis and wherein said first position is rotatively spaced from said second position by approximately 90°, and wherein said connection means includes a plurality of limit switches mounted on said frame adjacent said locking pins, each said switch having a normally open contact that is closed only when said frame is resting flat on a container, said switches being sufficiently proximate said locking pins that the frame can rest flat on a container only when all said locking pins enter corresponding container sockets, a pair of relays for controlling said motor in opposite rotative directions, and means in circuit with said limit switch contacts, said relays, and said wave receiver for operatively connecting said wave receiver to said relays only when all said limit switch contacts are closed.

4. Apparatus according to claim 3 including first means for sensing when said locking means are at said first disengaged position, second means for sensing when said locking means are at said second engaged locking position, and means connecting the relays of said pair of relays in circuit with respective said sensing means so that only one of said relays at a time can be energized to actuate said locking pin driving means in only one rotative direction at a time.

5. The apparatus according to claim 1 and wherein, said connecting means permits connection of said receiver to said driving means only when said frame is in contacting registry and resting unloaded on said container.

References Cited

UNITED STATES PATENTS

| 2,418,702 | 4/1947 | Dupont | 294—83 |
| 2,718,320 | 9/1955 | Nelson et al. | 294—81 |
| 3,015,407 | 1/1962 | Fesmire et al. | 294—81 |
| 3,104,909 | 9/1963 | Walker | 294—83 |
| 3,154,337 | 10/1964 | Walker | 294—83 |

ANDRES H. NIELSEN, Primary Examiner.